United States Patent [19]

Clausen

[11] 4,292,882
[45] Oct. 6, 1981

[54] ARMOR COMPRISING A PLURALITY OF LOOSELY RELATED SHEETS IN ASSOCIATION WITH A FRONTAL SHEET COMPRISING METAL ABRADING PARTICLES

[76] Inventor: Carol W. Clausen, 1715 E. Florence, Los Angeles, Calif. 90001

[21] Appl. No.: 966,385

[22] Filed: Dec. 4, 1978

Related U.S. Application Data

[63] Continuation-in-part of Ser. No. 804,230, Jun. 7, 1977, abandoned.

[51] Int. Cl.[2] .......................... B32B 5/28; B32B 7/00; F41H 1/02; F41H 5/04
[52] U.S. Cl. ......................................... 89/36 A; 2/2.5; 2/412; 109/49.5; 109/80; 109/81; 109/82; 428/240; 428/241; 428/242; 428/252; 428/911
[58] Field of Search .................... 109/49.5, 80, 81, 82; 89/36 A, 36 D, 36 Z, 36 N, 36 F, 36 H; 2/2.5, 412; 428/240, 241, 242, 252, 325, 328, 329, 331, 911

[56] References Cited

U.S. PATENT DOCUMENTS

| 3,559,210 | 2/1971  | Hansen ................................. 2/2.5 |
| 3,648,613 | 3/1972  | Cunn ................................. 109/49.5 |
| 3,700,534 | 10/1972 | Cook ..................................... 109/80 |
| 3,722,355 | 3/1973  | King ........................................ 2/2.5 |
| 3,859,892 | 1/1975  | Coes ..................................... 109/80 |
| 3,873,998 | 4/1975  | Norris et al. ............................. 2/2.5 |
| 3,924,038 | 12/1975 | McArdle et al. .................. 109/49.5 |
| 3,958,276 | 5/1976  | Clausen .............................. 428/911 |
| 4,079,464 | 3/1978  | Roggin .................................... 2/2.5 |
| 4,131,053 | 12/1978 | Ferguson ........................... 89/36 A |

*Primary Examiner*—J. C. Cannon

[57] ABSTRACT

Bullet proof armor comprising a laminated pad with front and rear surfaces and composed of a plurality of loosely related fabric sheets woven of fibres having high tensile strength, said fibres of the fabric adopted to establish gripping and holding engagement on the surface of bullets directed toward and impinging of said front surface and advancing into the pad, and metal abrading means comprising metal abrading particulate material at said front surface and adapted to abrade and condition the surface of bullets whereby the fibres of the fabric can better grip and hold onto the bullets.

10 Claims, 12 Drawing Figures

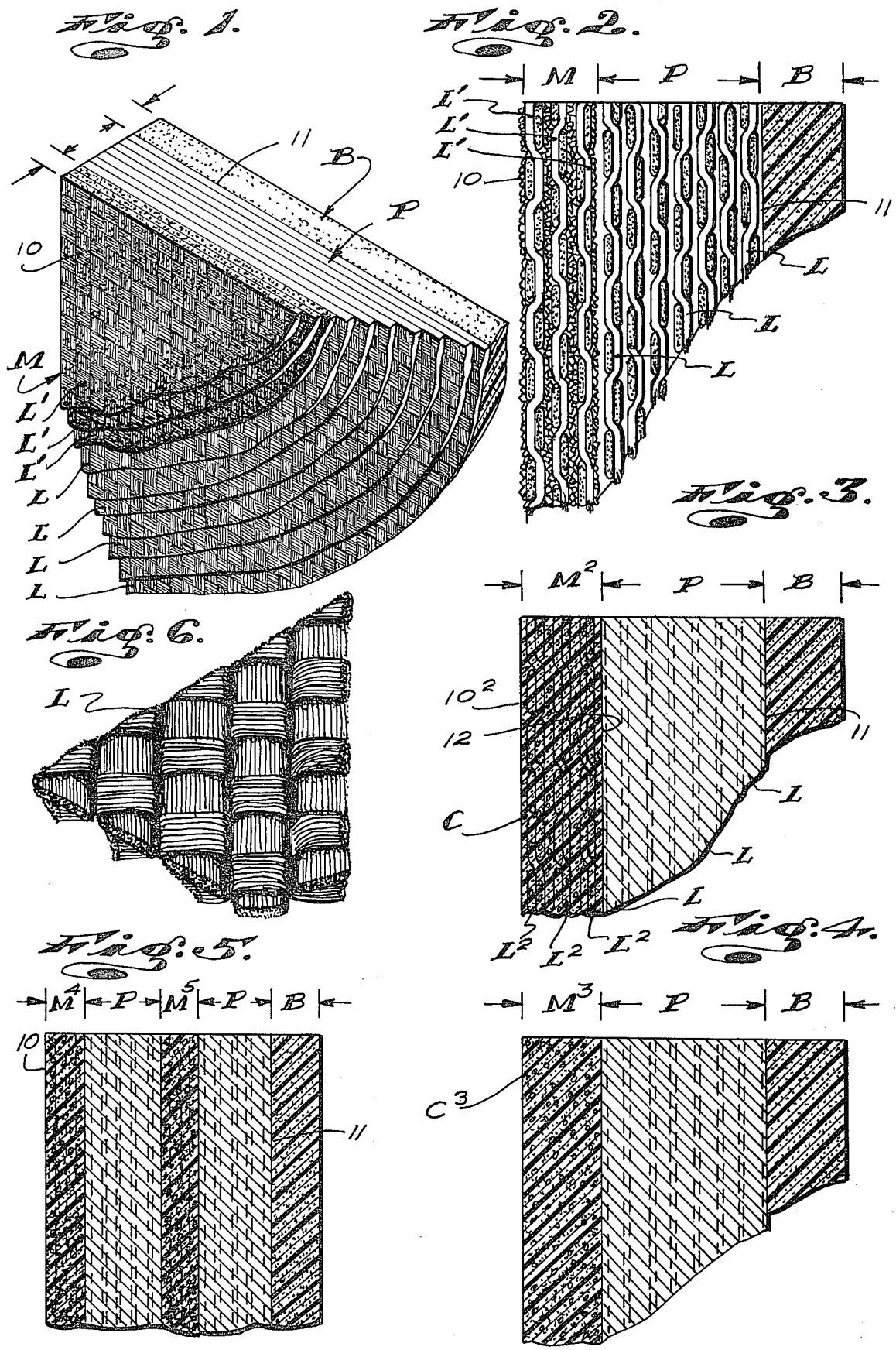

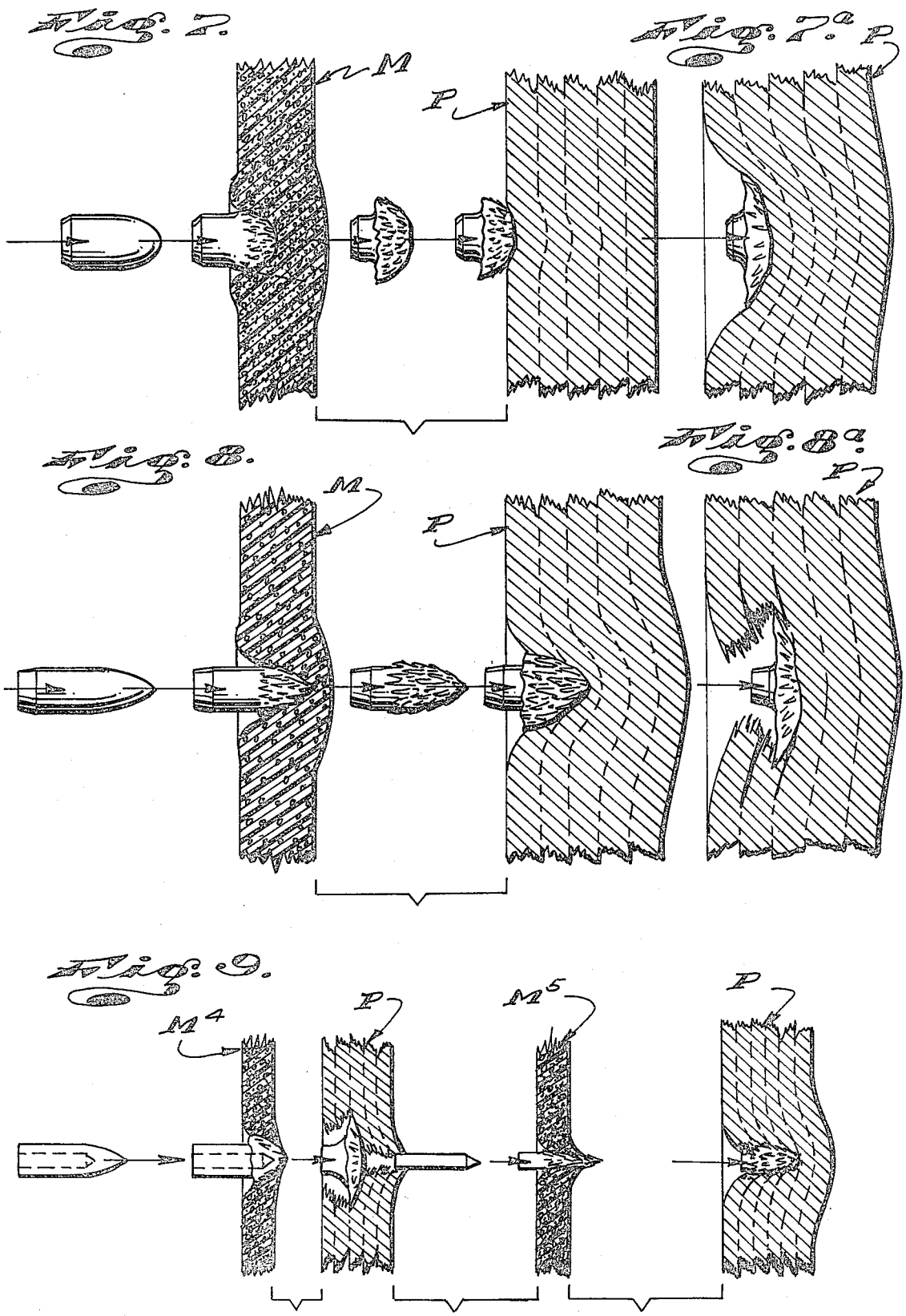

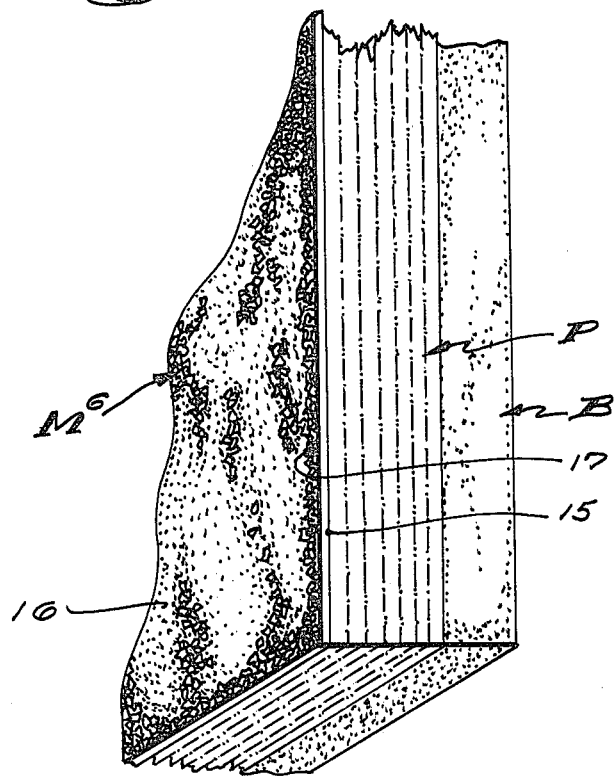

ARMOR COMPRISING A PLURALITY OF LOOSELY RELATED SHEETS IN ASSOCIATION WITH A FRONTAL SHEET COMPRISING METAL ABRADING PARTICLES

This application is a continuation in part of the application of CAROL W. CLAUSEN, Ser. No. 804,230, filed June 7, 1977 in the United States Patent and Trademark Office, entitled "ARMOR", and now abandoned.

This invention has to do with armor and is more particularly concerned with an improved laminated fabric bullet-proof barrier structure.

The art of armor is extremely old and highly developed. Armor can, as a rule, be divided into two distinct classes; first, there is heavy armor such as is used in fortified building structures, on battleships and the like; and second, there is light armor such as is provided to protect the bodies of troops and other personnel and to protect light, mobile or transportable equipment such as trucks, aircraft, radio equipment and the like.

The present invention relates to the latter class, or light armor.

In the past, light armor ordinarily consisted of heavy, rigid plates and the like established of dense, strong, metal alloys, ceramics and the like. The amount or extent of protection afforded by such armor was generally proportionate to its thickness and resulting weight. Due to the weight and rigid characteristics of materials used in such armor, the amount and/or effectiveness of armor that could be effectively provided in each application was materially restricted and/or limited.

As a result of the above, light armor has been of limited effectiveness. Such armor is generally considered to be effective to stop some projectiles such as large pieces of shrapnel and soft, low-speed bullets which directly impinge upon it but is considered by many to be of such questionable effectiveness that the inconveniences associated with its use outweigh its advantages.

In recent years, with the advent of new high strength, synthetic fibres and filaments, such as Nylon and carbon fibres, and with related advances in spinning and weaving techniques, unique fabrics having extraordinary strength and flexibility have been developed. It has been found that soft, flexible, light-weight armor barrier structures composed of pluralities of layers of certain new fabrics made up of these new fibres or filaments are considerably more effective to stop bullets and the like than are rigid armor plates of metal or ceramics of materially greater bulk and weight.

That fibre produced and sold by E. I. DuPont de Nemours and Company of Delaware and sold under the trademark Kevlar has been found to be particularly effective in the establishment of fabric for use in laminated fabric armor. Such Kevlar fibre fabric is generally loosely woven and is stretchable in many directions. The Kevlar fibre yarns employed in establishing the fabrics is made up of a multiplicity of extremely fine filaments of tempered long chain polyester resin such as is sold by DuPont under the trademark Nylon or Aramid. The yarn of this material or fabric is extremely strong and is such that it will absorb considerable kinetic energy of bullets and the like which impinge upon the fabric, before the fibres or filaments which make up the yarn break. Further, the yarn is sufficiently strong and tough that it tends to cause metal of bullets and the like to yield and deform against and/or about it when advanced into engagement with it with great force.

An important feature regarding Kevlar fabric's ability to slow and/or stop bullets resides in the fact that the fabric is flexible and imparted with sufficient resiliency so that it will yield and move in advance of an impinging bullet or the like to a substantial extent, before parting, breaking or tearing.

Accordingly fabrics such as Kevlar fabric, when employed in armor, must be supported for substantial free shifting and displacement under applied force. Such fabrics should not be supported in tension, within a rigid non-flexible matrix structure, or the like, to afford maximum bullet slowing and stopping effect.

In an armor barrier made up of a multiplicity of layers of Kevlar fabric or other equivalent fabric, as many as fifteen or twenty layers of fabric are employed to establish a soft, flexible pad, blanket or panel-like barrier structure having front and rear surfaces.

As a bullet or other projectile traveling at high speed impinges on the front surface of such a barrier, the first layer of fabric yields rearwardly in the path of the projectile. The yarn of the fabric engaged by the projectile frictionally grips, tends to bite into and deform the projectile and absorbs substantial kinetic energy from the projectile before the fibres or filaments thereof are overstressed and break and/or before the threads are moved aside and displaced by the projectile.

Before the projectile penetrates the first layer, it is deformed to an extent that the yarn fibres of the next layer can gain a better grip or bite on the projectile and so that its area of contact with the next layer of fabric is increased. The above process is repeated at each layer of fabric engaged by the projectile. It has been found that a rather low velocity, soft nosed 9 mm. bullet fired from a hand-gun at point blank range can be expected to penetrate six or seven layers of such a barrier before its kinetic energy is spent and before it comes to rest. Such a bullet can be expected to be deformed to a substantially flat mushroom shape.

The above noted form of laminated fabric armor is finding wide use for the establishment of bullet-proof vests, helmet liners and the like and is considered to be highly desirable and effective within limited ranges. That is, while it is effective to slow and stop soft low velocity bullets, it is recognized as being of limited effectiveness to stop high velocity bullets such as are propelled by magnum charges and to be of substantially no effect to stop hard-nosed, copper jacketed bullets such as military ball ammunition, traveling at moderate to high velocity.

Such armor has no apparent effect on or capacity to stop those hard-cased or jacketed high velocity bullets which are classifiable as armor-piercing bullets.

Some notable advances have been made in the above noted laminated fabric type of armor by those active in the art. One such advance is disclosed in U.S. Pat. No. 3,958,276 issued May 25, 1976 for HELMET. In the above identified patent, the laminated fabric armor is embodied in a helmet structure. The helmet includes a core of loosely related layers of Kevlar fabric between a soft inner liner and a thin, resilient and/or flexible outer skin composed of several layers of Kevlar fabric within a flexible, plastic matrix. The outer skin of this structure is such that it initially upsets and deforms a bullet by yieldingly holding and maintaining the fabric in place and limiting displacement of the fabric yarn and/or fibres in advance of an impinging bullet. That is, it initiates deformation of the bullet before it advances into engagement with the loosely related fabric laminations which go to make up the armor. The noted skin, while more effective to deform a bullet, is less effective to absorb the energy of and slow a bullet than the Kevlar fabric core. With this structure, after the bullet is initially upset by the skin, the laminated Kevlar fabric core can better engage and effectively slow and stop the bullet.

With the above structure, high velocity soft-nosed bullets fired at the armor structure with magnum charges, at point blank range, are effectively stopped within the first four or five layers of Kevlar fabric going to make up the core.

Again, while the above noted patented structure provided a notable advance in the art, it is not suitable or effective to stop jacketed, hard-nosed bullets such as military ball, of medium to high velocity and is totally ineffective to stop hard jacketed ammunition which would qualify or be classified as armor piercing.

Over a protracted period of experimenting and testing, it has been determined that the effectiveness of armor comprising laminated Kevlar fabric or similar fabrics is dependent largely upon the ability of the fibres or filaments of the fabric to engage and establish an effective purchase or grip on the surface of a bullet or other projectile and that if such a grip or purchase could be assured, the effective slowing and stopping of high velocity jacketed and armor piercing bullets could be effective. Accordingly, the inability of such armor to stop hard-nosed or jacketed bullets resides in the inability of the fabric fibres or filaments to engage and grip the bullet effectively and/or the ability of such bullets to slide by and displace the fibres or filaments in their path.

As a result of the above, we conceived that if the structure was provided with means to effectively scar, scratch or abrade the surface of hard jacketed bullets and the like and to therefore establish a surface which the fabric fibres or filaments could better grip, the effectiveness of the class or armor here concerned with would be materially enhanced and that its ability to effectively stop armor piercing bullets and all less penetrable bullets, could be assured.

To the above end, tests have been made with barriers comprising a multiplicity (10 or 15) layers of Kevlar fabric with various abrasive particulate matter, such as aluminum oxide, worked into the first or foremost three or four layers of fabric to substantially impregnate the front portion of the barriers therewith. Upon firing high velocity hard jacketed bullets into these test barriers, it was found that the exterior surfaces of the bullets were notably abraded; the fibres of the fabric better gripped the surfaces of the bullets and that the bullets seldom penetrated more than four or five layers of fabric (including the abrasive impregnated layers) before coming to rest.

While the above tests are not conclusive as to the effectiveness of such an armor structure in all environments and with respect to all forms of bullets, they clearly establish that the effectiveness of laminated fabric armor of the general class here concerned with is greatly dependent upon the ability of the fibres or filaments of the fabric to grip and hold onto the bullets directed into engagement with and moving through the armor and that the provision of means to work upon and treat the surfaces of the bullets to increase the ability of the fibres and/or filaments to grip the surfaces of bullets results in material increased effectiveness of such armor.

In furtherance of the above noted tests, it has been determined that by special use and treatment of fabric and abrasives in armor structures of the character referred to above, notable greater effectiveness and efficiencies can be attained.

An object of my invention is to provide an improved laminated fabric armor structure adapted to slow and stop bullets and which includes abrasive means to condition the surfaces of impinging bullets whereby the fabric can better grip the bullets and more effectively and efficiently deform, slow and stop said bullets.

It is another object of the invention to provide an armor structure of the general character referred to which is such that it requires a materially fewer number of layers of fabric to slow and stop bullets than do laminated fabric barriers without bullet abrading means and which is therefore less expensive to make, less bulky and lighter in weight than other laminated fabric barriers having like bullet slowing and stopping capabilities.

Another object and feature of the present invention is to provide an armor structure of the general character referred to wherein a predetermined number of adjacent layers of fabric which is less than all of the layers of fabric are impregnated with and carry hard, metal abrading particulate material.

Another object and feature of my invention is to provide an armor structure of the character referred to above wherein the abrasive particulate material is bonded and retained in the fabric layers with which it is related by adhesive means.

Still another object and feature of my invention is to provide an armor structure of the general character referred to wherein the particulate abrasive material is arranged on or within an independent laminate at the front surface of the assembly of fabric laminates.

Yet another object and feature of my invention is to provide a structure of the character referred to above wherein the layer of abrasive material is bonded and retained in a flexible plastic matrix.

It is another object and feature of the present invention to provide a structure of the character referred to above wherein the abrasive particulate material is composed of a plurality of different predetermined classified particle sizes in predetermined volumes whereby the particles of each smaller size substantially fit and establish bridging engagement in the interstices established by the bridgingly engaged particles of the next larger size whereby the material establishes a strong and dense, yet fluid, bridging structure wherein each particle is backed up and supported by adjacent particles and which is particularly effective to transmit applied forces throughout a substantial extent of the means.

Finally, it is an object of this invention to provide an armor structure of the character referred to which includes alternate layers composed of loosely related fabric sheets and abrasive particulate matter, wherein the layers of particulate matter include layers of fabric and a bonding agent to hold and retain the particulate matter in place.

The foregoing and other objects and features of my invention will be understood from the following detailed description of typical preferred forms and applications of my invention throughout which description reference is made to the accompanying drawings in which:

FIG. 1 is an isometric view of a portion of armor embodying our invention;

FIG. 2 is an enlarged detailed sectional view taken as indicated by line 2—2 on FIG. 1;

FIG. 3 is a view similar to FIG. 2 showing another form of our invention;

FIG. 4 is a view similar to FIG. 3 showing yet another form of the invention;

FIG. 5 is a view similar to FIG. 4 showing still another form of the invention;

FIG. 6 is an isometric view of a fabric employed in carrying out our invention;

FIG. 7 is an exploded view of my invention showing a bullet in four positions thereon;

FIG. 7a is a view of a portion of the structure shown on FIG. 7 with the bullet at rest;

FIGS. 8 and 8a are similar to FIGS. 7 and 7a showing another form of the invention;

FIG. 9 is an exploded view of the structure shown on FIG. 5; and

FIG. 10 is a view of another form of the invention.

Referring to the drawings, the armor A that I provide is a flexible blanket or pad-like structure composed of a plurality of normally flat, flexible sheets or layers L of woven fabric in substantial flat surface-to-surface contact with each other. The armor A has front and rear surfaces 10 and 11. For purposes of illustration, in FIGS. 1 through 4 I have shown the structure composed of ten layers.

The fabric that I have used in establishing my new armor is Kevlar fabric; that is, fabric woven of that fibre provided by E. I. DuPont de Nemours & Company and sold under the tradename Kevlar. This fabric is quite flexible and readily stretchable in most directions to varying degrees or extent.

While I have used and found Kevlar fabric to be suitable for carrying out my invention, I am aware that similar fabrics are or may be produced by others and further understand that a similar though more costly fabric established of carbon fibres or filaments and possessed with substantially greater strength than Kevlar fabric has been produced and is likely to be made commercially available.

In accordance with the above, reference to Kevlar fabric is intended to set forth one presently available fabric that can be effectively used in practicing our invention.

It is to be understood that in practice, any other fabric of suitable strength and flexibility which is presently available or which might be made available in the future can be used in the place of Kevlar fabric.

The armor structure A next includes abrading means M. In the form of the invention shown in FIGS. 1 and 2 of the drawings, the abrading means M consists of a volume or mass of abrasive particulate matter combined and related with a selected number of the foremost layers of fabric making up the armor. In the case illustrated, the three foremost or front layers L' of the armor are covered and impregnated with and carry the abrasive material of the means M. The abrasive material of the means M is bonded in and with the fabric layers L' by a suitable cement, not shown.

In practice, prior to assembling the structure, the particulate abrasive material can be deposited on each of the layers L' and worked into the fabric to fill and occupy most of the voids and interstices therein by suitably rubbing, shaking and otherwise working the material and fabric together. When the layers are substantially filled with the abrasive material, a thin light bonding agent is spread on the surfaces of the fabric to cement and/or seal the particulate material in place. Subsequently, and before the bonding agent or cement sets, the surfaces are dusted or covered with additional material and the several layers L' are sandwiched and bonded together.

With the means M thus established, the remaining layers L are arranged in substantial flat loose surface-to-surface relationship with each other and against or adjacent the rearmost layers L' of the means M, substantially as shown in the drawings.

The several layers L rearward of the means M establish what will herewith be referred to as the pad portion of the armor. The pad portion is identified by reference character P.

It is to be particularly noted that the above armor establishes a flexible sheet or blanket-like assembly which can be advantageously cut and/or molded to establish armor barriers in an infinite number of different sizes and shapes. For example, an armor blanket can be made to overlie or engage about various hardware and/or equipment such as the underside or floor boards of motor vehicles. Further, formable armor pads or panels can be made to establish bullet-proof vests, headgear, liners for helmets and the like.

In accordance with the preferred carrying out of my invention, the armor A can be provided with a resilient compressible or compactable backup layer or pad B of foam rubber or the like, overlying the rear surface 11 of the basic armor structure. Such a backup pad yieldingly supports and retains the fabric laminations L in a desired manner and prevents undesirable displacement thereof. The pad B is not necessary in all instances.

In FIG. 3 of the drawings, the particulate abrasive material and related fabric layers $L^2$ of the means $M^2$ are bonded within a matrix C of suitable flexible plastic. The matrix C is such that it establishes an impervious outer skin with a finished front surface $10^2$ and a rear surface 12. Further, the outer skin-like matrix C is such that it can be molded and formed to any suitable predetermined form or shape. For example, it can be made in the form of and can establish the finished exterior shell of an otherwise conventional helmet structure.

While the matrix C is preferably flexible, it can be made sufficiently stiff and firm to yieldingly establish a form which will not, under normal circumstances and conditions, change or alter. In the case of a helmet, the helmet might be such that it can be manually deformed by the purposeful application of manual force or pressure, but such that it would not adversely alter its shape under applied forces within the range and magnitude of forces to which helmets are commonly subjected in their day to day use.

In the form of the invention shown in FIG. 4 of the drawings, the means $M^3$ includes a flexible plastic matrix $C^3$ in which the abrasive material is held captive. No fabric is provided. In all other respects, this form of the invention is the same as that shown in FIG. 3 of the drawings.

In FIG. 5 of the drawings, the invention includes two abrading means $M^4$ and $M^5$. The means $M^4$ is at the front of the laminated pad structure P, while the means $M^5$ is inserted within the laminated pad structure. This form of the invention is basically a compounding or doubling up of one of the previous forms of the invention.

This compound form of the invention is effective to stop armor piercing bullets which consist of jacketed outer primary bodies and hard central cores which continue forward travel after the primary bodies have engaged and stopped on target. The means $M^4$ and the pad P inward thereof slow and stop the primary body of the bullet. Thereafter, the means $M^5$ and the pad P inward thereof slow and stop the onwardly traveling core of the bullet.

Referring to FIG. 10 of the drawings, the means $M^6$ consist of a thin gauge plastic or steel plate or substrate 15 with a coating 16 of abrasive material bonded on the front surface 17 thereof. This form of the invention had proven to be as effective as the other forms of the invention in a number of circumstances and under the most commonly encountered conditions.

In each form of the invention, the abrading means are at the front surfaces of the laminated fabric pads and serve to abrade the surfaces of bullets impinging upon and penetrating the structure, whereby the fibres of the fabric rearward of the abrading means more effectively grip and hold onto the surfaces of the bullets as they move rearwardly into the structures. With the ability to better grip and hold onto the surfaces of the bullets, the full potential of the fibres or filaments of the fabric to deform, slow and stop the bullets is better utilized.

Basically, the invention involves laminated fabric padding armor which include bullet abrading means to abrade and condition the surfaces of bullets to be worked upon and stopped by the laminated fabric padding. Therefore, the several forms of the invention illustrated and described above are but selected examples of suitable and effective embodiments of the invention.

In practice, the abrasive material establishing the means M can be any suitable hard abrasive material which is capable of effectively abrading those metals which are employed to make bullets, bullet jackets and/or the cores of armor-piercing bullets.

Many particulate abrasive materials, suitable for carrying out the present invention, are in abundant supply and most are rather inexpensive. Such materials are commonly screened and are provided in various classified sizes. One such material which I have found to be particularly effective and suitable for use in my invention is aluminum oxide having a screen size of 60. Carborundum and garnet sands have been used and found to be satisfactory.

A series of tests have been conducted to compare the bullet stopping effect of laminated fabric armor structures with and without the abrading means that I provide. The first test structures (which did not include the abrading means) included outer shells made up of two layers of Kevlar fabric in a resilient polyester resin or plastic matrix. The shells varied from about 1/16" to ¼" thick. The first test structures next included laminated cores or pads made up of ten layers of loosely related Kevlar fabric. Finally, the first test structures included liners of compactible foam plastic which served to back up and retain the laminated cores in position. The second test structures were the same as the first test structures except that the outer shells were made up of two layers of Kevlar fabric impregnated with aluminum oxide having a screen size of 60, and bonded by thin flexible plasticized polyester resin, used as a cement or glue, to retain the materials in position.

Heavy jacketed 124 gr., 9 mm. bullets and 158 gr., 357 magnum bullets were fired at the above noted first and second test structures at velocities exceeding 1500 feet per second, under identical conditions. In the case of the first test structures, both the 9 mm. and 357 magnum bullets fired into the structures went through the shells and at least six layers of the laminated fabric cores or pads. On occasions, the bullets were not stopped. In the case of the second test structures, similar 9 mm. and 357 magnum bullets, fired under identical conditions, penetrated or went through the shells (with abrading means) and were stopped at or by the first layer of fabric of the cores or pads.

Preliminary tests utilizing different abrasive materials and different means to carry and support those materials have been and are continuing to be made. To date, while such tests have not been concluded, no one one superior and preferred abrading means structure has been ascertained to exist. Such testing has clearly pointed to the fact that notably superior, more effective and dependable results than were attained by the above noted first completed series of tests are attainable.

Preliminary testing has established that by mixing predetermined volumes of predetermined different sizes of particulate abrading material, a denser and stronger abrading means, capable of more effectively and dependably abrading and deforming harder more pointed and higher velocity bullets than were used in the first above noted series of tests, can be provided.

It has been ascertained, by testing, that by supporting, containing and/or keeping the abrasive materials closely assembled or together in a secure and stable manner, greatly enhances the ability of the particulate matter engaged by the bullets to effectively abrade, deform and/or deflect bullets.

To the above end, and so as to provide a more stable, strong and effective particulate material structure for our abrading means, a plurality of predetermined different sizes of particles of abrading material, each in a predetermined volume, are mixed together or combined. The sizes and volumes of particles are selected so that the particles of each smaller size substantially fill and establish bridging engagement in the voids and/or interstices established by the next larger size of particles when said next larger size of particles are in bridging engagement with each other. With such a combination of particles, each larger size of particles in the mass is backed up and supported by the next smaller size of particles, whereby the stability, strength and capacity of the mass of related particles to effectively abrade, deform and otherwise work upon bullets engaging and/or penetrating the mass is enhanced.

In practice, an abrading means established of two different sizes of particles is notably more effective than such a means established of but one size of particles. As the number of different sizes of particles is increased, the effectiveness of the abrading means appears to increase.

In practice, it is contemplated that particle sizes ranging from as large as 1/32" to sub-micron sizes could be effectively employed.

Further, the thickness of the mass of particulate matter establishing our abrading means can be varied as desired or as circumstances require. It is presently questioned whether an abrading means such as here provided can be made less than 1/64" thick and remain effective and dependable. Further, it is questionable that such a means need ever be greater than ¼" thick in armor designed to stop bullets fired from hand guns.

The means provided or employed to bind, keep, hold or retain the particulate matter in place and/or together can vary widely in form. Tests only indicate the desirability that the binding, holding, keeping or retaining means be such that it tends to hold the particles in set position and prevent easy shifting and displacement thereof under normal circumstances.

It appears to be most important that the retaining means be such that the particles of the mass of abrading material be maintained in bridging contact whereby forces applied at any one point or portion of the mass are transmitted and dispersed throughout the greatest possible area or extent of the mass.

It has been determined that the abrading means M should not include means to bind or otherwise keep the particulate matter contained and in place which might render the abrading means brittle and/or frangible. If the abrading means is made brittle, or frangible, it is effective to stop one bullet but is so shattered and broken up thereby that further use and effectiveness, of a substantial extent of the structure, is lost or left to question and/or doubt.

It is presently understood that a most flexible and supple armor structure embodying our invention and capable of an infinite number of general and specific applications is provided when the abrading means M is composed of two or more layers of flexible fabric such as Kevlar fabric, impregnated and/or coated with abrasive particulate materials and wherein the assemblage is bonded together with a soft, flexible latex cement or the like. Such a structure is illustrated in FIGS. 1 and 2 of the drawings. In such a structure, the fabric is effective to prevent free displacement of the particulate material by the applied forces of an impinging bullet or the like and the cement yieldingly holds and retains the particulate material and fabric in proper working position.

Where great flexibility and suppleness is not required, and where the establishment of armor with some predetermined and fixed shape or configuration is required or desired, it is presently considered preferable that the particulate matter of the abrading means be bonded, held, or otherwise retained in and by a non-brittle plastic matrix such as is shown in FIG. 4 of the drawings, or by a combination of several laminations of fabric and a plastic matrix such as is shown in FIG. 3 of the drawings.

FIG. 7 of the drawings is an exploded view of my basic armor structure, such as is shown in FIGS. 1 and 2 of the drawings, and in which the general manner in which 9 mm. heavy jacketed bullets and pure lead 357 magnum bullets are worked upon and stopped is illustrated. FIG. 7a of the drawings illustrates the general condition and/or relationship of those bullets and the pad P when the bullets are stopped and at rest in the pad.

FIGS. 8 and 8a are similar to FIGS. 7 and 7a and illustrate the manner in which those forms of my new armor shown in FIGS. 3 and 4 of the drawings have been observed to work upon and stop certain hard jacketed, high velocity, armor piercing bullets.

FIG. 9 is an exploded view of a compound form of my invention, such as shown in FIG. 5 of the drawings and described above. FIG. 9 shows the general manner in which a hard-core type of armor piercing type of bullet will be worked upon and stopped by the structure that I provide.

It is apparent that if desired, or if circumstances require, a compound armor structure such as is shown in FIG. 9 of the drawings can be provided with a third, fourth or any desired number of related abrading means M and pads P to meet special requirements or circumstances. Such compound or multi-layered armor barriers having an aggregate thickness of, for example, 3" or 6", would be easily moldable to conform to irregular shaped structures with which they might be related and would be a small fraction of the weight and would have or afford many times the bullet stopping capability of conventional metal armor plating of equal thickness.

It is important to note that the armor structure here provided is such that it can be made into a cover-like structure to be engaged about the exterior of a related structure; a liner-like structure to be arranged within the interior of a related structure; or, can be made in the form of a filler-like structure to be incorporated within a related supporting structure.

Preliminary tests have shown that my new armor structure has a marked tendency to deflect or cause the direction of travel or armor piercing bullets to change within the armor structure. Such change in direction of the bullets is laterally within the armor and is such that the bullets, after penetrating and being worked upon by the abrading means, often penetrate no more than two or three layers of the pads. As the approach angle of such bullets becomes more acute relative to the front surface of the armor, the degree to which they are deflected within the armor is greatly increased. The instances where such bullets are not deflected appear to be exceptional. It is understood and believed that such deflection of bullets is a result of the fact that all of the particles of the means M which engage the bullets do not affect the same amount of work or engage the bullets to the same extent and thereby urge and/or drag the bullets out of course as the bullets advance through the means M.

In the case of armor piercing bullets, the above function of the means M to change the course or deflect bullets appears to be of equal importance to the functions of conditioning the surfaces and deforming the bullets.

In the preceding, the terms "plastic cement" and "glue" refer generally to any material or medium which might be used to hold or stick or bind the particulate material in place and can, in addition to polyester, epoxy and phenalic resins, include materials such as shellac, casein glue, varnishes and the like. Metal abrading particulate material, as here used, is meant to include any non-ductile, non-malleable particulate material which is harder than the metals to be worked upon and which is such that it will cut, scratch or abrade the surfaces of those metals when it is urged into moving contact therewith.

Having described only typical preferred forms and applications of our invention, I do not wish to be limited to the specific details herein set forth, but wish to reserve to myself any modifications and/or variations that may appear to those skilled in the art and which fall within the scope of the following claims:

Having described my invention, I claim:

1. A bullet proof armor panel structure including a pad comprising a multiplicity of normally flat sheets of fabric in loosely related surface to surface relationship, said pad having front and rear surfaces, and a flat metal abrading means with front and rear surfaces arranged with its rear surface opposing the front surface of the pad, said abrading means including a mass of hard metal abrading particulate material arranged with its particles in substantial bridging contact with each other and binding means normally maintaining the particles in substantial fixed position.

2. The armor panel structure set forth in claim 1 wherein said sheets of fabric are flexible and pliable, said pad is flexible and pliable and said binding means maintaining the particulate matter in substantial fixed position is flexible, whereby the armor panel structure is flexible.

3. The armor panel structure set forth in claim 2 wherein the binding means includes a multiplicity of normally flat sheets of fabric in and about which said particulate material is deposited and a cement bonding those sheets and the particulate material together.

4. The armor panel structure set forth in claim 2 wherein the binding means includes a resin matrix in which the particulate material is set.

5. The armor panel structure set forth in claim 2 wherein the binding means includes a multiplicity of fabric sheets extending through the particulate material and a resin matrix in which the particulate material and the sheets of fabric related thereto are set.

6. The armor panel structure set forth in claim 1 wherein the binding means includes a multiplicity of normally flat sheets of fabric in and about which said particulate material is deposited and a cement binding those sheets and the particulate material together.

7. The armor panel structure set forth in claim 1 wherein the binding means includes a resin matrix in which the particulate material is set.

8. The armor panel structure set forth in claim 1 wherein the binding means includes a multiplicity of fabric sheets extending through the particulate material and a resin matrix in which the particulate material and the sheets of fabric related thereto are set.

9. The armor panel structure set forth in claim 1 which further includes an impact absorbing deformable liner adjacent the rear surface of the pad.

10. The armor panel structure set forth in claim 1 wherein the layer of particulate material is made up of a plurality of predetermined volumes of predetermined different sizes of particles which are such that the particles of each smaller size of particles occur within the voids and interstices established by the next larger size of particles and establish bridging supporting engagement with and between the next larger size of particles adjacent thereto when said next larger size of particles are in bridging contact with each other.

* * * * *